(12) United States Patent
Gilbert et al.

(10) Patent No.: US 6,430,504 B1
(45) Date of Patent: *Aug. 6, 2002

(54) USER INTERFACE FOR GLOBAL POSITIONING SYSTEM RECEIVER

(75) Inventors: Charles Gilbert, Sunnyvale; Ann Ciganer, San Mateo, both of CA (US)

(73) Assignee: Trimble Navigation Ltd., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/519,717

(22) Filed: Mar. 7, 2000

(51) Int. Cl.$^7$ .............................. G01C 21/00; G01S 5/04

(52) U.S. Cl. .................................. 701/213; 342/357.12

(58) Field of Search ..................... 701/213; 342/357.03, 342/357.12

(56) References Cited

U.S. PATENT DOCUMENTS

| | | | |
|---|---|---|---|
| 5,572,218 A | | 11/1996 | Cohen et al. |
| 5,805,145 A | * | 9/1998 | Jaeger ........................ 345/172 |
| 6,223,053 B1 | * | 4/2001 | Friedmann et al. ......... 455/552 |

OTHER PUBLICATIONS

Marshall, Bob, "A Low Cost Two Chip Solution for GPS Sensor Applications", Conf. Proc. WESCON '97, Nov. 1997, pp. 2–7.*

Brown, Alison et al, "Digital L–Band Receiver Architecture with Direct RF Sampling", PLANS 1994, Apr. 1994, pp. 209–216.*

Logsdon, Tom, "The NAVSTAR Global Positioning System", copyright 1992 by Van Nostrand Reinhold, chap. 6, pp. 76–90.*

Parkinson, Bradford et al, "Optimal Locations of Pseudolites for Differential GPS", Navigation: Journal of The Institute of Navigation, vol. 33, No. 4, Winter 1986–1987, pp. 65–89.*

Proceedings of The 9$^{th}$ International Technical Meeting of The Satellite Division of the Institute of Navigation, "ION GPS–96", part 2 of 2, Sep. 17–20, 1996, Kansas City Convention Center, Kansas City, Missouri, pp. 1719–1728.

"Global Positioning System: Theory and Applications vol. 2, vol. 164, Progress in Astronautics and Aeronautics", Edited by Bradford W. Parkinson, published by the American Institute of Aeronautics and Astronautics, Inc., pp. 51–80.

"The GPS Pseudolite Solution For Next–Generation Mobility Control",Copyright 1998–2000, IntegriNautics: Inc200, 3 pgs., Feb. 29, 2000, http://www.integrinautics.com/datasheet/in200/in200.html.

"Popular News Publications On IntegriNautics", IntegriNautics: News & Press, Mar. 1, 2000, Copyright 1998–2000, 2 pgs., http://www.integrinautics.com/news.html.

* cited by examiner

*Primary Examiner*—Gregory C. Issing
(74) *Attorney, Agent, or Firm*—Blakely Sokoloff Taylor & Zafman LLP

(57) ABSTRACT

A control system for a combined GPS receiver and pseudolite receiver that allows adjustment of a number of data collection (i.e., configuration) parameters for the receiver. Preferably, a single interface allows for setting multiple parameters at the same time. Setting the configuration parameters may be in response to a user input specifying a desired quality of position estimate to be provided by the receiver and may be accomplished using a slide bar control. The slide bar control may be a graphical representation displayed to the user and may allow the user to choose from a number of predetermined settings, each corresponding to a set of different configuration parameters for the receiver.

31 Claims, 9 Drawing Sheets

| CONFIG. PARAMETERS | SCALE | MAX QUALITY ‖———|———|———|———|———|———|———|———‖ | | | | | | | MAX QUANTITY |
|---|---|---|---|---|---|---|---|---|---|
| PDOP MASK | | 4 | 4.5 | 5 | 5.5 | 6 | 7 | 8 | 12 | 20 |
| SNR MASK | | 6 | 5.5 | 5 | 4.5 | 4 | 3.5 | 3 | 2.5 | 2 |
| Mm # OF SV | | 5 | 5 | 5 | 4 | 4 | 4 | 4 | 3 | 3 |
| ELEV. MASK | | 15 | 15 | 15 | 14 | 13 | 13 | 12 | 10 | 5 |
| PL | | DON'T USE PL | DON'T USE PL | DON'T USE PL | USE PL | USE PL | USE PL | USE PL | USE PL | USE PL |

| CONFIG. PARAMETERS \ SCALE | MAX QUALITY = | | | | | | | | MAX QUANTITY = |
|---|---|---|---|---|---|---|---|---|---|
| PDOP MASK | 4 | 4.5 | 5 | 5.5 | 6 | 7 | 8 | 12 | 20 |
| SNR MASK | 6 | 5.5 | 5 | 4.5 | 4 | 3.5 | 3 | 2.5 | 2 |
| Mm # OF SV | 5 | 5 | 5 | 4 | 4 | 4 | 4 | 3 | 3 |
| ELEV. MASK PSEUDOLITE | 15 | 15 | 15 | 14 | 13 | 13 | 12 | 10 | 5 |
| SIGNAL STRENGTH | DON'T USE PL | DON'T USE PL | DON'T USE PL | USE PL | USE PL | USE PL | USE PL | USE PL | USE PL |

FIG. 5B

USER INTERFACE FOR GLOBAL POSITIONING SYSTEM RECEIVER

FIELD OF THE INVENTION

The present invention relates generally to global positioning system (GPS) receivers and, more particularly, to the control of configuration or operating parameters for such receivers.

BACKGROUND

GPS receivers are designed to provide estimates of a user's position on or near the surface of the earth based on ranging measurements to orbiting satellites. Performance capabilities of such receivers are primarily affected by two factors. First, satellite geometry, which causes geometric dilution of precision, and second, ranging errors.

Ranging errors are generally organized within six major areas including errors due to satellite ephemeris information, satellite clock errors, ionospheric group delay, tropospheric group delay, multipath errors, and receiver measurement errors. Modern GPS receivers typically employ processing techniques to reduce or eliminate the effects of these errors.

Geometric dilution errors can be calculated for any instantaneous satellite configuration as seen from a particular user's location. It has been determined that for a 21-satellite constellation and a three-dimensional position fix, the world-wide median value of the geometric dilution factor is approximately 2.7. This quantity is usually called the position dilution of precision (PDOP). Typical usable PDOP factors range from approximately 1.5 to approximately 8. In general, PDOP factors may vary between 1.0 and ∞, however, most users will not accept positions computed with a PDOP of greater than approximately 15. Variations in this PDOP factor are typically much greater than the variations in ranging errors.

Using these error factors, the root mean square (RMS) position error provided by a conventional GPS receiver may be expressed as follows:

RMS position error=geometric dilution×RMS ranging error. See, e.g., Bradford W. Parkinson and James J. Spilker Jr., *Global Positioning System: Theory and Applications*, Vol. 1, p. 16 (1996). Thus, the lower the geometric dilution factor (usually PDOP for terrestrial applications), the better the position estimate that a GPS receiver is able to provide.

Understanding the effect PDOP (or any one of a variety of other parameters for that matter) has on the accuracy of position estimates provided by a GPS receiver is important; especially considering that conventional GPS receivers typically do not utilize all of the satellite data which they receive to derive a position estimate. Instead, most GPS receivers employ masks or filters to select only data from those satellites which satisfy certain selection criteria (e.g., minimum elevation above the horizon) to derive a position solution. For example, filters or masks may be used to ensure that a desired maximum PDOP is permitted.

The use of such filters is important because, to achieve a positioning accuracy to a given requirement (say±1.0 meter), the ranging accuracy and satellite geometry must both be within acceptable tolerances. For example, if individual ranging measurements to satellites have statistically independent error of zero mean, then PDOP becomes a direct multiplier in determining position error. Generally, if PDOP rises above six, it is an indication that satellite geometry is not very good from the user's stand point, and significant position errors can be expected. By controlling the limit on the maximum acceptable PDOP then, a GPS receiver can be configured to provide position fixes to a desired degree of accuracy.

In addition to PDOP, many other factors influence the relative accuracy of a position determination made by a GPS receiver. Among these factors are the number of satellites used to compute the position fix, the relative signal to noise (SNR) strength of the data signals received from those satellites, satellite geometry and cutoff elevation. In addition, the optimal configuration of operating parameters is also a function of both the work environment and the user's application. For example, the optimal configuration for a city environment is different from a rural environment. Furthermore, one user's application may require a fast acquisition and determination of location while another may require a highly precise determination of position, regardless of the amount of time required to determine the position.

In the past, some conventional GPS receivers have allowed users to modify some of these configuration parameters individually, in order to allow the user to customize the receiver for a given application or environment. However, knowing which receiver parameters to adjust, and in what fashion, typically requires knowledge about the satellite data signals which are currently being received. In most cases, users either do not have such information or are not familiar enough with the operation of the receiver to make an intelligent decision about which configuration parameter(s) to adjust and how. Accordingly, what is needed is a means of easily adjusting the configuration parameters of a GPS receiver to achieve a desired degree of accuracy in the position estimates provided thereby.

SUMMARY OF INVENTION

The present invention provides, in one embodiment, a control system for a GPS receiver that allows users to easily and simultaneously adjust multiple data collection (i.e., configuration) or operating parameters for the receiver. Thus, if a user is unsuccessful in obtaining a position fix with a given set of receiver configuration parameters, those parameters may be quickly modified to allow the user to obtain a position fix.

In another embodiment, the present invention provides a method of setting configuration parameters for a GPS receiver in response to user input specifying a desired quality of position estimate to be provided by the receiver. The user input may be received using a slide bar control, which may be a graphical representation displayed to the user. The slide bar control may allow the user to choose from a number of predetermined settings, each corresponding to a set of GPS receivers configuration parameters. Distribution of the settings over the range of the slide bar control need not be linear. Preferably, each set of the configuration parameters includes a setting for a PDOP mask, an SNR mask, an elevation mask and a minimum number of satellites to be used by the receiver in making a position compensation. In other embodiments, other combinations of configuration parameters may comprise a set.

In an alternate embodiment, the present invention provides an apparatus and method for setting parameters to use for position estimates in a combination GPS and Pseudolite receiver.

These and other features and advantages of the present invention will be apparent from the detailed description and its accompanying drawings which follow.

BRIEF DESCRIPTION OF THE DRAWINGS

The present invention is illustrated by way of example, and not limitation, in the figures of the accompanying drawings in which:

FIG. 4c illustrates an exemplary graphical representation of the slide bar control;

FIGS. 5a and 5b are tables listing exemplary configuration parameter settings for a slide bar interface;

DETAILED DESCRIPTION

Described herein is a control system for a GPS receiver or GPS/Pseudolite combination receiver which allows a user to adjust multiple data collection (i.e., configuration) or operating parameters for the receiver. Although discussed with reference to the exemplary embodiment which comprises a slide bar interface, the present invention may be implemented using a variety of types of interfaces. For example, in addition to the slide bar interface to be discussed in detail below, the present invention may be implemented as a dial control or other convenient mechanical and/or graphical user interface mechanism. Indeed, the slide bar interface itself may be implemented in a number of ways, including a graphical representation controlled with user input means (e.g., buttons, dial controls, etc.) or a physical slider similar to some user controls (e.g., sliding volume controls) found on audio/video equipment, etc.). Accordingly, the exemplary embodiments discussed below should in no way limit the more general spirit and scope of the present invention.

Figure 1A:
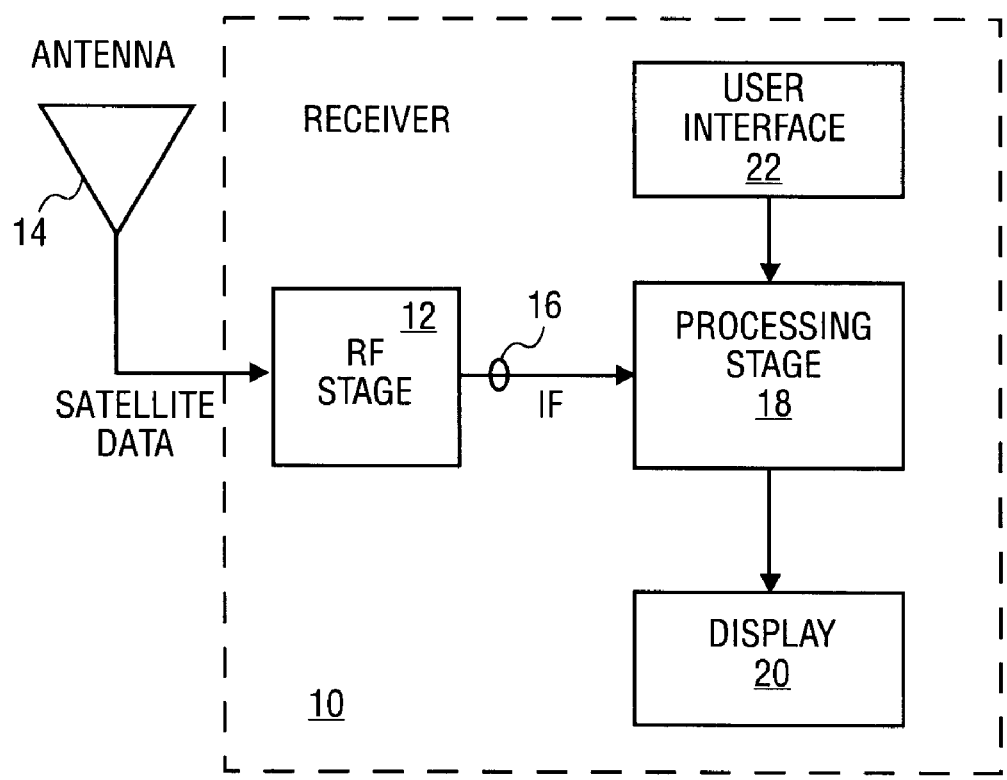
FIG. 1a illustrates one embodiment of a GPS receiver having a user interface configured in accordance with the teachings of the present invention.

FIG. 1a illustrates one embodiment of a GPS receiver 10 configured in accordance with the present invention. Receiver 10 generally includes an RF stage 12 which receives satellite data signals collected by an antenna 14. In some cases receiver 10 and antenna 14 may be included within the same housing. In general, RF stage 12 provides amplification and down converting of the satellite data signals collected by antenna 14 and produces intermediate frequency (IF) output signals 16 therefrom. The IF signals 16 are subsequently provided to a processing stage 18.

Processing stage 18 may be implemented in hardware (e.g., as correlators or one or more application specific integrated circuits), software (e.g., running on a general purpose microprocessor or a dedicated digital signal processor) or a combination of both. As will be discussed below, in determining which satellites to use in making the position computations, processing stage 18 relies in part on user input received from a user interface 22. In general, processing stage 18 operates on the IF signals 16 to determine the position of receiver 10 (or, more particularly, antenna 14). For example, processing stage 18 may utilize the down converted satellite data signals to determine pseudoranges to the orbiting GPS satellites from which those signals were received. Based on these pseudoranges, an estimate of the position of receiver 10 may be derived (e.g., using GPS ranging techniques common in the art, including differential GPS processing techniques) and that position estimate may be presented to a user on an associated display 20. Display 20 may be an alpha-numeric and/or graphical display. In one exemplary embodiment, display 20 is a liquid crystal display (LCD).

The optimal performance of the receiver is directly related to the type of application the receiver is performing, as well as the environment in which the receiver is operating. For example, the performance of the receiver will vary significantly between an open field in a rural area, in which a large number of satellites are in view, and a city with a number of skyscrapers in close proximity which block satellites from view. Furthermore, the user application will dictate optimal performance. In some instances a user requires fast acquisition of the signals needed to compute location. At other times, acquisition time is not as important as the accuracy or level of precision of the location determined.

The present invention enables the user to easily control operating or configuration parameters using the user interface 22 without specifically and individually changing the parameters. Preferably, a single control is used to control a plurality of parameters.

In general, user interface 22 provides means for setting parameters of receiver 10, those parameters specifying a qualitative or quantitative value such as a desired quality of the position estimate, speed of acquisition or type of usage to be provided by processing stage 18. More specifically, user interface 22 is part of a control system for receiver 10 that allows users to easily and simultaneously adjust multiple data collection parameters for the receiver. For example, if a user is unsuccessful in obtaining a position fix with a given set of receiver configuration parameters, those parameters may be quickly modified, via user interface 22, to allow the user to obtain a position fix. The position fix so obtained may be less accurate (due to the modification of the receiver's configuration parameters) than one which would have been obtained using the original configuration parameter settings; however, as no fixes were being achieved at those settings, this (possibly less accurate) newly obtained position fix at least provides the user with an indication of his or her position (i.e., the position of antenna 14). Alternately, a user may trade precision for speed of acquisition.

Figure 1B:
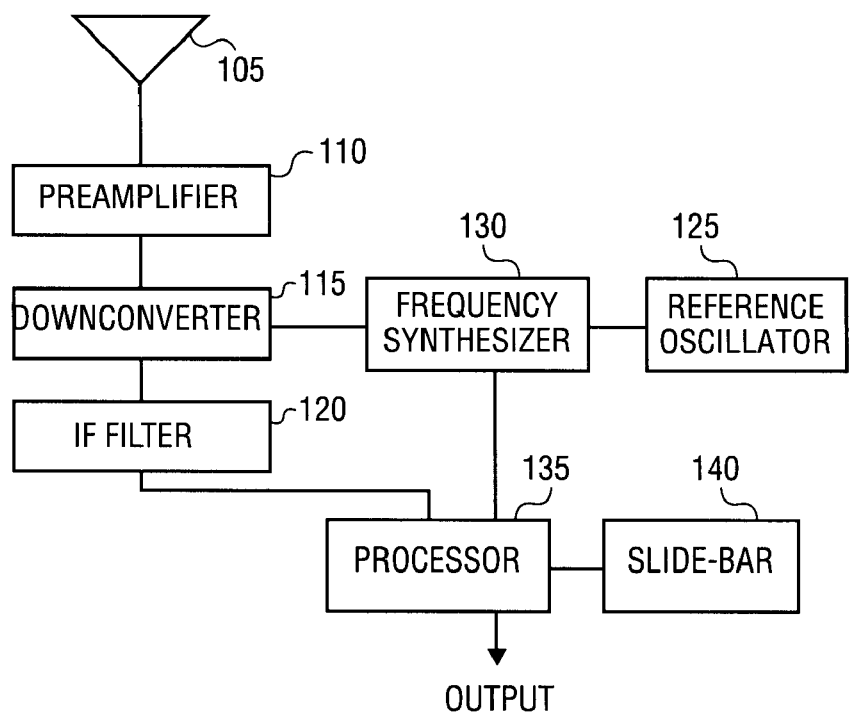
FIG. 1b illustrates an alternate embodiment of a GPS receiver having a user interface configured in accordance with the teachings of the present invention.

An alternate embodiment of a receiver is illustrated in FIG. 1b. The antenna 105 receives the positioning signals from a plurality of satellites in view. A received signal is processed by the preamplifier 110 and the down-converter 115 converts the signal to an intermediate frequency that is easier to process. IF filter 120 filters out noise and interference and increases the amplitude of the signal plus noise to a workable signal processing level.

The reference oscillator 125 provides a time and frequency reference for the receiver. The reference oscillator 125 output is used in the frequency synthesizer 130 which generates local oscillators and clocks used by the receiver. The processor performs the signal processing function required to determine position. In the present embodiment, the processor 135 is shown as a single block processing element. However, at implementation, the processing function may be divided among one or more processors. For example, there may be a signal processing processor that generates data, including pseudo ranges, pseudo range rates, delta pseudo ranges, signal-to-noise ratios, local receiver time tags and other GPS system data. An applications processor may also be provided which controls the signal processing function and uses the outputs of the signal processing processor to generate data for a particular user application.

Figure 1C:
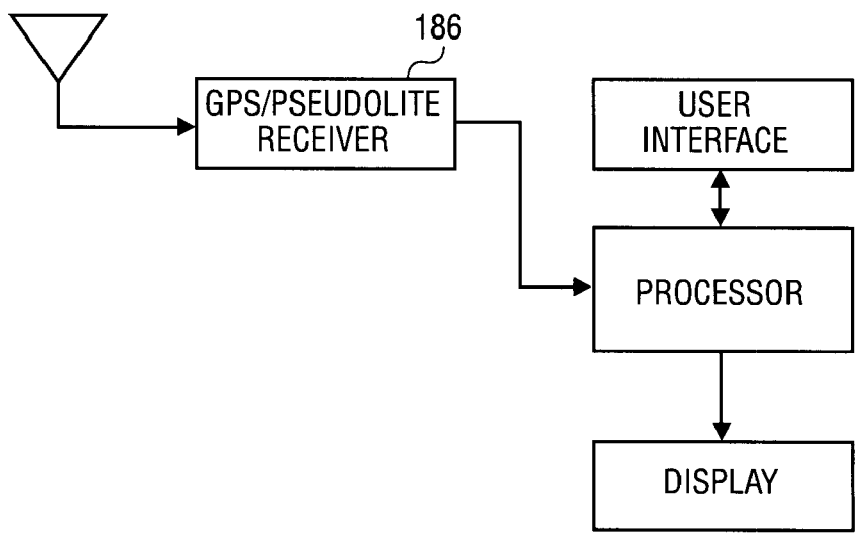
FIG. 1c illustrates an alternate embodiment of a combined GPS receiver and pseudolite receiver having a user interface configured in accordance with the teachings of the present invention.

In an alternate embodiment, as illustrated by FIG. 1c, an estimate of the position of the receiver may be performed using a pseudolite receiver or a combination of a GPS and Pseudolite receiver. Pseudolites are transmitters of GPS-like signals, often mounted in fixed locations on earth. Pseudolites transmit ephemeris data on their location along with the other information associate with a GPS satellite message. Typically, pseudolites transmit messages in the same format and often at the same frequency as GPS satellites. Pseudolites transmit with relatively high power compared to the signal levels from satellites; thereby making their signals more readily available. To avoid drowning out the satellite signals, the pseudolite transmission is typically pulsed on very briefly, for as little as 1 or 2 milliseconds. Pseudolites may augment the basic satellite constellation with additional signals which can be received for over 100 km from the pseudolite location. For a discussion regarding pseudolites, see Cohen, U.S. Pat. No.: 5,572,218 and Bradford W. Parkinson and James J. Spilker, Jr., *Global Positioning System: Theory and Applications* Vol. 11, pp.51–79.

An embodiment in which the pseudolites transmit at the same frequency and format at GPS satellites is illustrated in FIG. 1c. A receiver 186 are coupled to a processor 188, for example an embodiment of the processing stage 18 or processor 135, to provide position measurements using the GPS information, pseudolite information or a combination of the GPS and pseudolite information received. For example, knowledge of the pseudolite and its relative signal strength may be provided to determine sources to use to determine position. Alternately, the detected presence pseudolite(s) (e.g., by analysis of signal strength) may be incorporated into a position calculation. The Dilution of Precision may be improved with a pseudolite signal incorporated into the position calculations, as it is normally not common to experience a strong signal from a low elevation point. Therefore, accuracy can be improved. In another embodiment, the slider can be configured to incorporate a set of rules to accept a worse satellite geometry than otherwise would be acceptable if a pseudolite is available. Alternately, in one embodiment, a pseudolite is selectively used if the user requires a fast fix. In another embodiment the use of pseudolites may be selected by the user manually selecting whether to use pseudolite in the positioning calculations.

It should be noted that GPS receivers are typically not equipped to track pseudolites, especially if there is any significant motion of the receiver relative to the pseudolite, and if the receiver is in close proximity to the pseudolite. The reason is that Doppler shifting of the signals results in larger shifts than normal receivers can handle. This extra challenge can be handled by switching the tracking parameters used in the tracking software routines executing in the receiver or processor. Thus, for example, a GPS receiver can be enabled to track pseudolites by choosing a second software module that substitutes one set of tracking bandwidth parameters for another. Typical tracing bandwidth parameters in a non-pseudolite enabled receivers are in the range of 0.01 to 10 Hertz, whereas in pseudolite enabled receivers, he bandwidths are typically on the order of 10's or 100's of Hertz. The set up of software routines and switching between the same is known in the art.

These changes in bandwidth affect receiver performance. Thus, with wider bandwidths, the short term accuracy is affected. Therefore, the pseudolite ready receiver option may typically be invoked whenever fast fixes with low accuracy is needed. This might occur when satellite availability is poor.

In some pseudolites, the signal is transmitted at frequencies offset from the fundamental GPS carrier, L1 or L2 (1575.42 MHz or 1227 MHz). In the event that pseudolites are implemented that transmit at frequencies offset from the fundamental carrier, but still in the same allocated bandwidth, additional modifications to the receiver is preferable. For example, a "split spectrum" pseudolite system may be used in which the center frequency of the pseudolite carrier is located at either of the nulls of the P(Y) code signal, thus putting them at +/−10.23 MHz above or below L1 or L2 band centers. In this embodiment, the receiver is configured to process such offset carriers as well as those of the satellites. This may be achieved using modern digital sampling receiver technology.

Figure 2A:
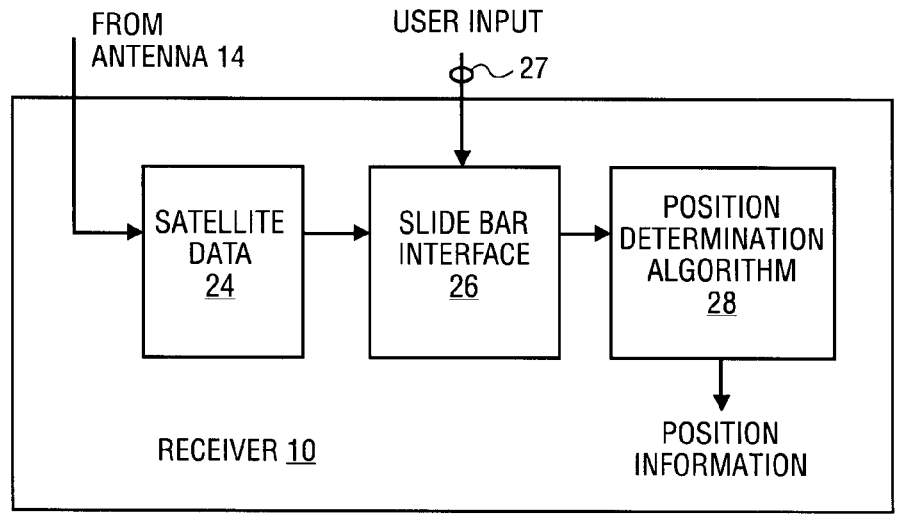
FIGS. 2a and 2b are functional representations of receivers and illustrate embodiments of slide bar interfaces which are exemplary embodiments of the present invention.
Figure 2B:
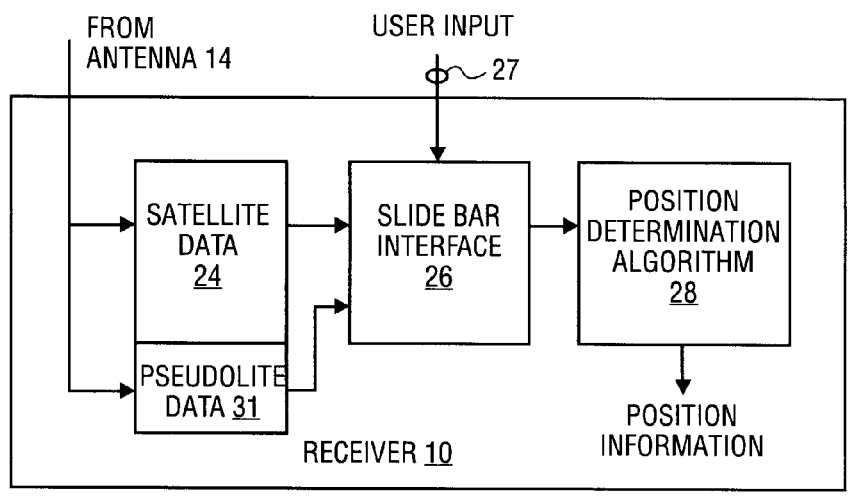

FIGS. 2a and 2b illustrates certain functional portions of some embodiments of a receiver 10. In this embodiment, a slide bar interface, as discussed below, is used. However, alternate embodiments may be implemented. For example, the user input received through the user interface may be input a numeric or alphanumeric value which is used as parameters to generate parameter input to the position processing algorithm or application specific algorithm to determine how the position computations are determined.

Referring to the embodiment in FIGS. 2a and 2b, satellite data 24 received from antenna 14 is filtered by a slide bar interface 26. Slide bar interface 26 is under the control of user input 27, e.g., received through user interface 22. In general, slide bar interface 26 will pass only those portions of satellite data 24 and/or pseudlolite data 31 which meet user specified criteria to achieve a desired quality of position estimate. Such data which meets those criteria is provided to a position determination algorithm 28 which may be executed by processing stage 18 to produce the position information.

Figure 6:
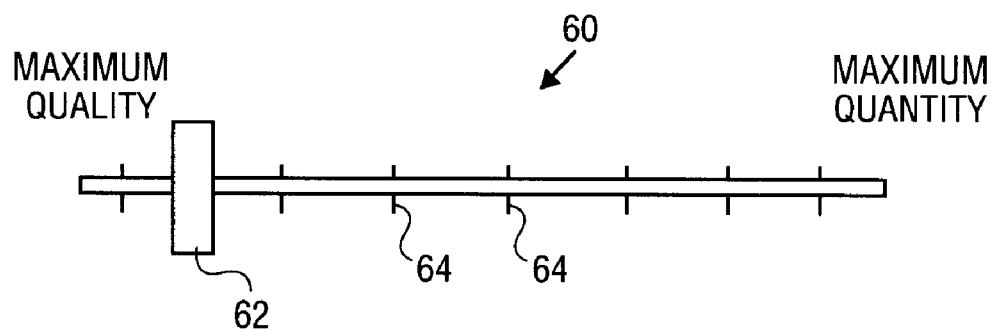
FIG. 6 illustrates a physical slide bar control for use according to one embodiment of the present invention.

Slide bar interface 26 provides means for setting configuration parameters for GPS receiver 10 in response to user input 27 which specifies the desired performance of the receiver 10. The user input 27 may be received using a slide bar control, which may be a graphical representation displayed to the user. Such a graphical representation is discussed further below. Alternatively, the mechanism used to control slide bar interface 26 may be implemented as a dial control or other convenient user interface mechanism. Indeed, the slide bar control may be implemented as a physical slider, similar to some user controls (e.g., sliding volume controls) found on audio/video equipment, etc.). Such a slide bar control 60 is illustrated in FIG. 6.

The slide bar control 60 includes a slider 62 that may allow the user to move between maximum and minimum control settings. This enables he user to choose from a number of settings 64, each corresponding to a set of GPS receiver configuration parameters. In the present embodiment, the perceived minimum value 305 is identified as maximizing quality and the maximum value 315 is identified as minimizing quantity. It is readily apparent that the labels associated with performance versus quality can be identified a variety of ways. Thus, the user simply moves the slider between the minimum and the maximum to adjust the performance of the receiver. The system responds to movement of the slider by adjusting corresponding operating parameters automatically without the user requiring to identify adjustments to parameters, or even the particular parameters to be adjusted.

Figure 3:
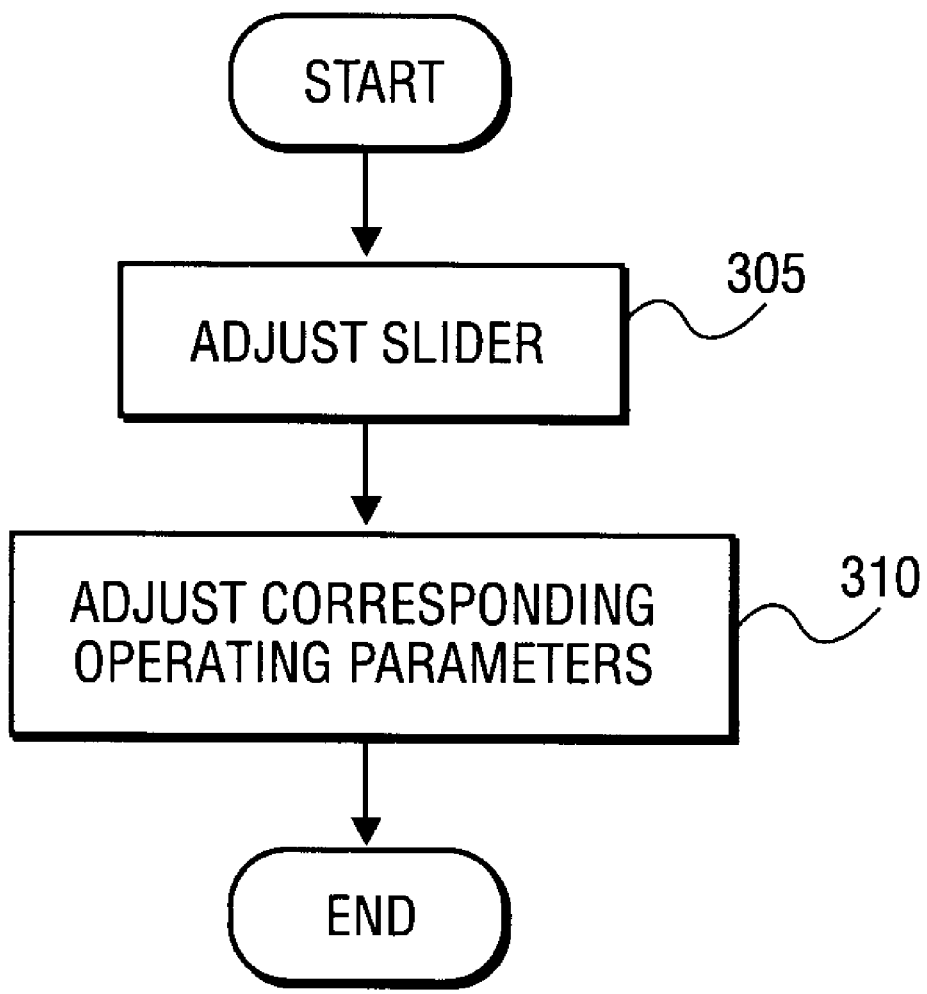
FIG. 3 is a simplified flow diagram of one embodiment of a process in accordance with the teachings of the present invention.

The process is described simply with respect to FIG. 3. At step 305 the slider is adjusted, and at step 310 the corresponding operating parameters are adjusted according to the location of the slider. For example, if the user is not receiving enough position information frequently enough, the user simply slides the slider to the right. To the contrary, if the quality of position information determined is not sufficient, the user slides the slider to the left. It is contemplated that the slide control can adjust a variety of predetermined operating parameters that may affect performance and quality. In one embodiment, the slide bar controls the following parameters: Position Dilution of Precision (PDOP) mask, Signal-To-Noise Ratio (SNR) mask, Elevation mask, and minimum number of satellites to use to generate positions. In an alternate embodiment, the slide bar controls the following parameters: PDOP mask, SNR mask, elevation mask, minimum number of satellites to use and minimum strength of pseudolite signals to use.

The operating parameter settings that correspond to different slider positions on the slide bar can also vary in application. Preferably the settings of the operating parameters are empirically determined. In the present embodiment, the numeric settings are non-linear, as some settings have a more pronounced effect on the system performance than others. For example, PDOP has a greater impact on position quality than SNR. To accommodate these observations, different parameters change at different rates and change in a non linear manner. Of course, other slide bar controller implementations may be used.

Figure 4A:
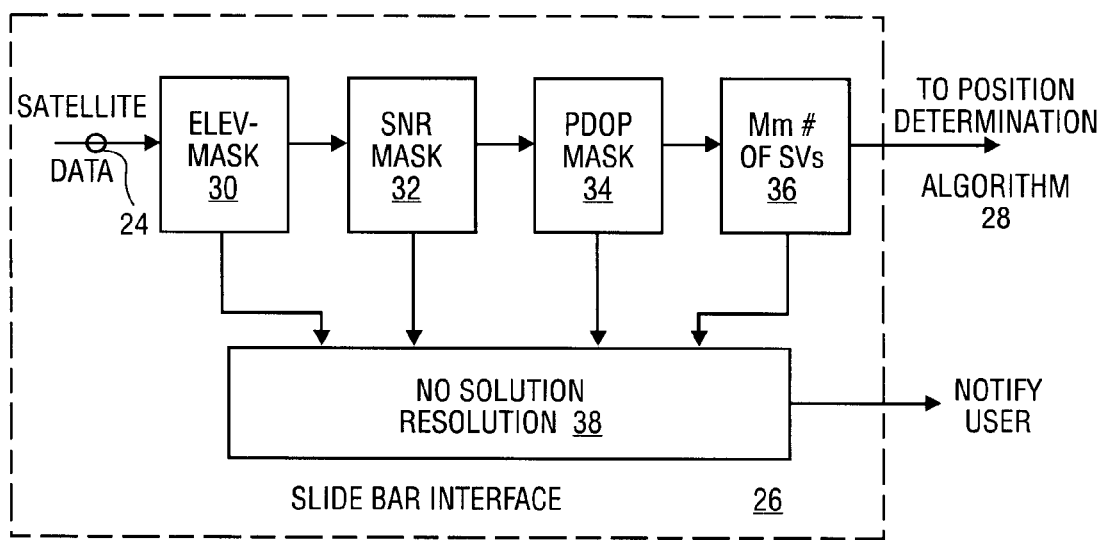
FIGS. 4a and 4b illustrate embodiments of a slide bar interface shown in more detail.

FIG. 4a illustrates one embodiment of a slide bar interface 26 in further detail. As shown, slide bar interface 26 may have a number of stages (four for the illustrated embodiment), each of which, define a configuration parameter for the receiver 10. The operation of the number of stages may be configured using a single user interface control such as the slide bar described herein.

Satellite data 24 may first be applied to an elevation mask 30. The purpose of elevation mask 30 is to exclude data from those satellites that are positioned below a designated elevation threshold as seen by antenna 14. In this way, only signals from satellites, which are positioned at elevations sufficiently above the horizon so as to contribute to a position fix of the desired quality are utilized by receiver 10.

Signals, which are not excluded by elevation mask 30, are then applied to a signal to noise ratio (SNR) mask 32. SNR mask 32 allows only those signals which have a sufficient signal to noise ratio so as to contribute to a position fix of the desired quality to pass. Those signals are then applied to a PDOP mask 34, which filters out those signals from satellites, which do not meet a desired PDOP criterion. Remaining signals are applied to a stage 36, which ensures that data signals from at least a designated minimum number of satellites are still present.

Assuming signals from a sufficient number of satellites so as to contribute to a position fix of the desired quality are still present, those signals are applied to the position determination algorithm 28 to compute an estimate of the position of receiver 10.

As shown, each of the stages 30, 32, 34 and 36 of slide bar interface 26 will exclude signals which may otherwise have been used for the position computation. If at any time insufficient data remains to achieve a position solution which would meet or exceed the desired quality (as specified by user input 27), that information is reported to a stage 38. Stage 38 is a "no solution resolution stage" which recognizes that insufficient information or satellite data signals is/are present in the received satellite data 24 to satisfy the desired quality of position fix. Stage 38 may report this information to the user (e.g., by reporting an error message to processing stage 18, which may then cause a message to be displayed to the user on display 20) as a prompt for the user to select a different set of configuration parameter using slide bar interface 26. It should be appreciated that two or more of the above-described filtering operations may be performed in parallel rather than in the serial fashion discussed above. Furthermore, the stages described above may be implemented as a single stage. Alternately, such functionality may be implemented directly in a computation performed in software or hardware. Furthermore, in alternate embodiments, the masks may be realized as weighting functions or other types of filters, which manipulate the data to perform computations.

Figure 4B:
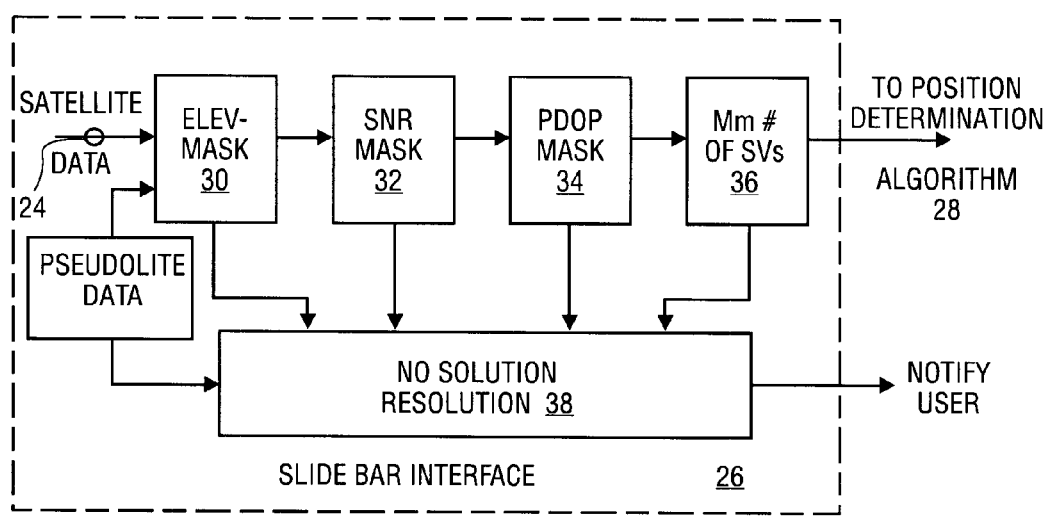

An alternate embodiment is illustrated by FIG. 4b. In FIG. 4b, the slide bar interface includes pseudolite data that may be selectively included as a value used in the position determination algorithm based upon prespecified criteria. For example, pseudolite data may be used for position determination if the user requires a fast position fix. Alternately, pseudolite data may be used for position determination if the signal strength of the received pseudolite signal is greater than minimum signal strength indicative of a valid signal.

Figures 4C, 5A:
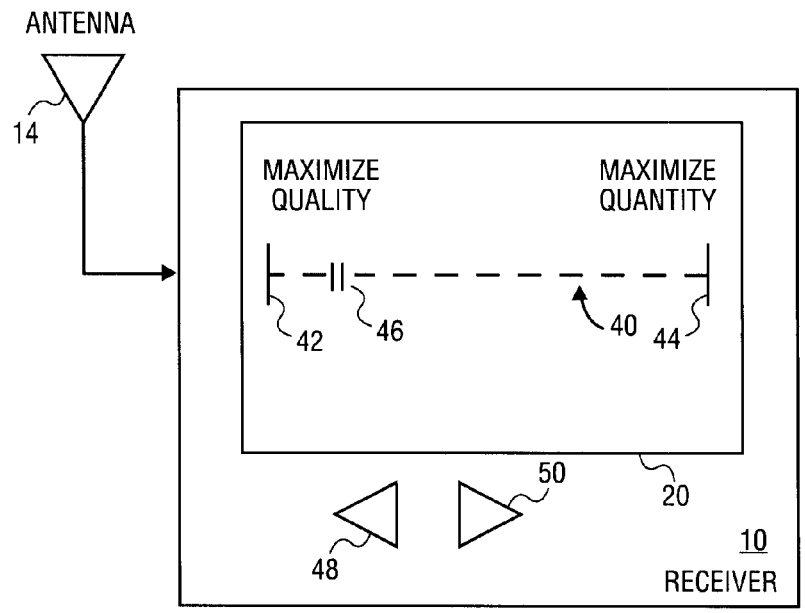

Now referring to FIG. 4c, one exemplary implementation of a slide bar control 26 is shown. In this example, a slide bar control is a graphical representation 40 displayed on display 20 of receiver 10. The graphical representation 40 simulates a slide bar (e.g., slide bar 60) that can move between two limits 42 and 44. Preferably, a "maximize quality" limit 42 corresponds to receiver configuration that will maximize the quality of position estimates provided by receiver 10. In general, such a configuration is achieved using data from a relatively high number of satellites, the satellites which together have a low PDOP, and a high signal-to-noise ratio signal strength and are positioned relatively high above the horizon seen by antenna 14. At the opposite end of the graphical representation 40 is a "maximize quantity" limit 44, which corresponds to a receiver configuration that would maximize the number of position estimates provided by receiver 10. These position estimates may not be as accurate, depending on the satellite geometry, etc., at the time, but enables the user to obtain a faster estimate of his or her position. Such a configuration may be characterized by utilizing satellite data from as many satellites and pseudolites as possible. The satellites together may have a high PDOP, low signal-to-noise ratio signal strength and may be positioned relatively low above the horizon seen by antenna 14.

The slider 46 of the graphical representation 40 of the slide bar control may be controlled using push buttons 48 and 50 on the face of receiver 10 (or any other convenient means of controlling the slider 46). In this embodiment, as a user presses push button 48, slider 46 moves toward limit 42, for example stopping at predetermined settings of slide bar interface 26. Similarly, as the user presses push bottom 50, slider 46 moves towards limit 44, again stopping at predetermined settings between the limits. It is apparent that the slider 46 may be moved a variety of ways including using certain keys on a keypad, or select and drag operations on the slider graphically displayed.

FIG. 5a is a table illustrating exemplary sets of receiver configuration parameters for various settings of slide bar interface 26. These particular sets of parameters have been empirically found to provide increasing quality of position fixes as one moves from right to left in the table. However, these exemplary sets of parameters should be regarded as illustrative and not restrictive of the scope of the present invention. Furthermore, it should be realized that operation using these parameters may be step-wise or continuous, using proper interpolation or empirical techniques to provide continuous settings.

FIG. 5b is a table illustrating exemplary sets of receiver configuration parameters for various setting of slide bar interface 86 that receives both satellite and pseudolite data. In this embodiment, a pseudolite is selectively used if the user requires a fast fix. Other embodiments are also contemplated. For example, the use or weight of the pseudolite may be determined based upon the signal strength of the pseudolite signal received at the receiver. In an alternate embodiment, a pseudolite is selectively used or weighted based upon the velocity of the receiver may be moving at (e.g., in a vehicle).

Referring back to the example illustrated by FIG. 5a, the parameters set by slide bar interface 26 correspond to the mask stages illustrated in FIG. 4a. In particular, settings for PDOP, SNR, elevation and a minimum number of satellites are used, however, other combinations of two or more GPS receiver parameters may also be used. In addition, the values may be weighted according to the location of the slide bar manipulated by the user. The various sets of configuration parameters may correspond to predetermined stops for the slider 46. Thus, when slider 46 is positioned at the "maximize quality" limit 42, slide bar interface 26 will be configured so that elevation mask 30 is set to exclude signals from those satellites which are lower than 15 degrees above the horizon seen by antenna 14. Similarly, SNR mask 32 will be set to reject satellite signals which have a signal-to-noise ration of lower than 5.5 units. In this example, the SNR mask settings do not necessarily correspond to familiar logarithmically scaled signal-to-noise ratio measures. Instead, the SNR settings may be linearly scaled measures. The same setting for slide bar interface 26 will require that signals from a minimum of 5 satellites are present at stage 34. Further, those satellites must have a PDOP of 4 or better as determined by PDOP mask 36. The other sets of configuration parameters illustrated in the table of FIG. 5a have similar effects on the mask settings for slide bar interface 26 and may correspond to various stops between limits 42 and 44 as described above. Thus, by positioning slider 46 at one position, multiple data collection (i.e., configuration) parameters for receiver 10 have been set. As seen in the table, the sets of configuration parameters corresponding to the predetermined settings of the slide bar interface 26 are distributed in a non-linear fashion over the range of settings provided thereby.

In operation, if a user is unable to achieve any position fixes with slider 46 set at the stop corresponding to the maximum quality setting of slide bar interface 26, the user may quickly modify the receiver's configuration parameters (i.e., those controlled by slide bar interface 26) by adjusting the position of slider 46. As slider 46 is moved to other positions along the slide bar shown as graphical representation 40, the various masks of slide bar interface 26 are adjusted to correspond to the settings shown in the table of FIG. 5a. In some cases, if slider 46 is adjusted to a position between two designated stops, receiver 10 may interpolate between the configuration parameter settings which correspond to those stops and configure the masks of slide bar interface 26 appropriately. Thus, slide bar interface 26 provides a control system for that allows users to easily and simultaneously adjust multiple data collection (i.e., configuration) parameters for receiver 10.

In an alternate embodiment, the functionality of the slide bar interface will operate in accordance with the table of FIG. 5b that takes into account signals from available satellites and pseudolites. This embodiment will operate similar to the embodiment discussed above with respect to FIG. 5a; however, the pseudolite mask will be adjusted to accept or reject pseudolite data dependent upon the setting of the slider 46.

Figure 7A:
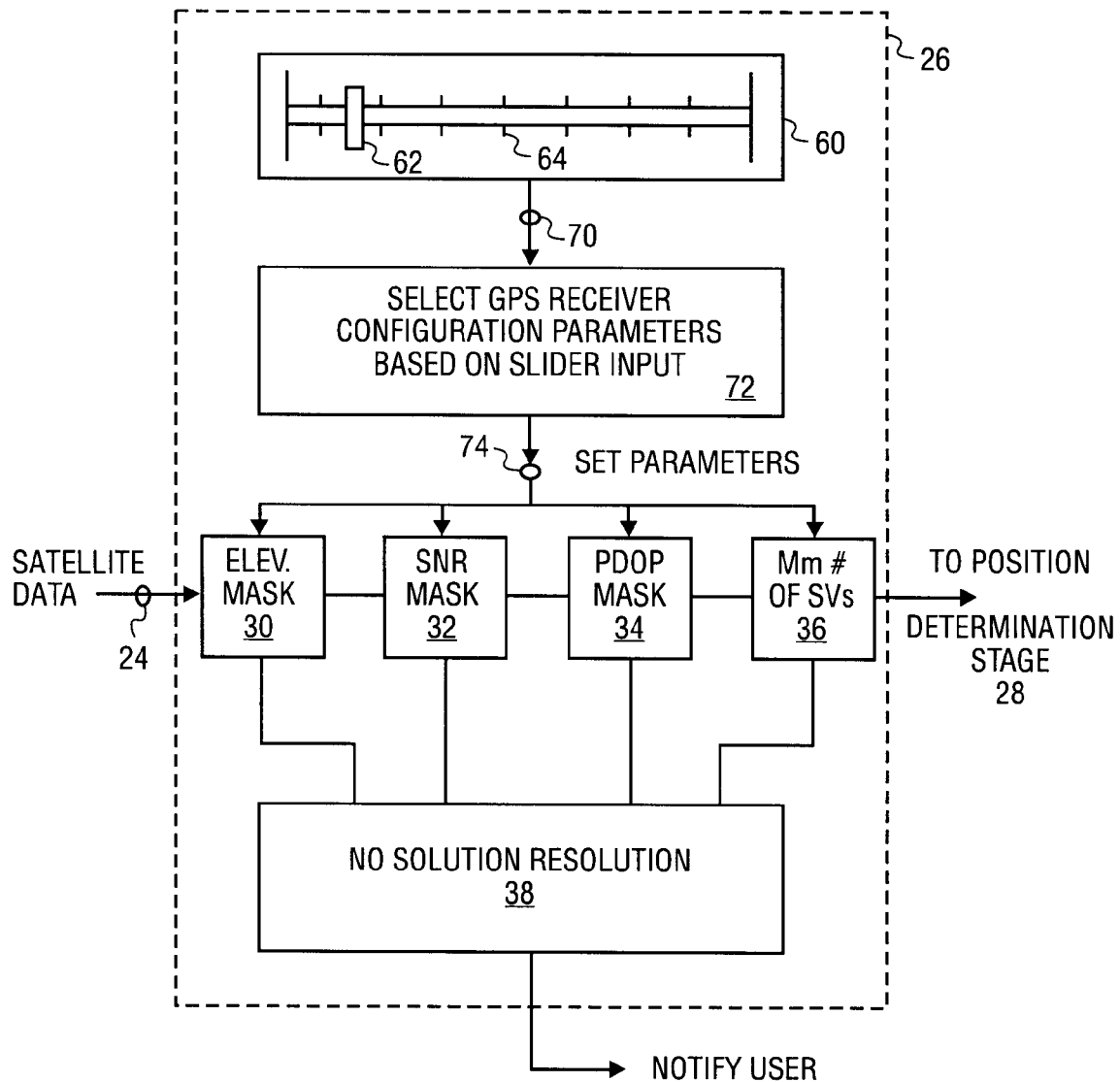
FIGS. 7a and 7b illustrate slide bar interfaces according to further embodiments of the present invention.

Now referring to FIG. 7a, an exemplary configuration of a complete slide bar interface 26 which provides means for setting configuration parameters for GPS receiver 10 in response to user input which specifies a desired quality of position estimate to be provided by receiver 10 is shown. The user input may be received using a slide bar control, which may be a graphical representation displayed to the user or, as shown, may be a physical slide bar control 60 as described above. The slide bar control 60 includes a slider 62 that may allow the user to choose from a number of predetermined settings 64, each corresponding to a set of GPS receiver configuration parameters. Distribution of the settings 64 over the range of the slide bar control 60 need not be linear. Preferably, each set of the configuration parameters includes a setting for a PDOP mask, an SNR mask, an elevation mask and a minimum number of satellites to be used by receiver 10 in making a position compensation. Of course, other slide bar controller implementations may be used and such controllers may allow for choosing only a limited (or, indeed, an expanded set of receiver configuration parameters), which may or may not include some or all of the above-mentioned configuration parameters.

Slide bar control 60 provides a selection signal 70 to selection means 72. The selection signal 70 corresponds to the setting of slide bar control 60 which the user has indicated. This will correspond to the desired receiver configuration. The select signal 70 is used to access the stored configuration parameter settings in selection means 72. For example, select signal 70 may be used to access a table as described above with reference to FIG. 5a to allow for a selection of a set of receiver configuration parameters that correspond to the setting of slide bar control 60. In response, selection means 72 provides a set of parameters settings 74 to the stages 30, 32, 34 and 36 which define the various masks to be employed.

The number of stages which define a configuration parameter for the receiver 10 may vary, depending upon the number of configuration parameters which may operate under the control of slide bar control 60. In any event, satellite data 24 may first be applied to an elevation mask 30. The purpose of elevation mask 30 is to weight or to exclude data from those satellites which are positioned below a designated elevation threshold as seen by antenna 14. In this way, only signals from satellites which are positioned at elevations sufficiently above the horizon so as to contribute to a position fix of the desired quality are utilized by receiver 10. Elevation mask 30 is set according to the parameter settings 74 provided by selection means 72

The signals are then applied to a signal to noise ratio (SNR) mask 32. SNR mask 32 masks or weighs those signals according to the signal to noise ratio. For example, mask 32 allows only those signals which have a sufficient signal to noise ratio, as determined by the setting of the SNR mask according to the parameter settings 74, so as to contribute to a position fix of the desired quality to pass. The signals are also applied to a PDOP mask 34 which weights or filters out signals from satellites according to a predetermined PDOP criterion. For example, the mask 34 filters out signals which do not meet a desired PDOP criterion. PDOP mask may also be set at a desired level according to parameter settings 74. Signals are passed to stage 36 which weights or filters out according to the number of visible satellites. For example, the stage 36 filters out those data signals that are not originating from at least a designated minimum number of satellites. The number of satellites for the desired quality of position fix is set according to the parameter settings 74 provided by selection means 72 based on the position of slider 62.

Once processed and assuming the minimum data requirements set by the mask are met, the signals are applied to the position determination algorithm 28 to compute an estimate of the position of receiver 10.

As shown, each of the stages 30, 32, 34 and 36 of slide bar interface 26 will weight or exclude signals which may otherwise have been used for the position computation. If at any time insufficient data remains to achieve a position solution which would meet or exceed the desired quality (as specified by user input 27), that information is reported to a stage 38. Stage 38 is a "no solution resolution stage" which recognizes that insufficient information or satellite data signals is/are present in the received satellite data 24 to satisfy the desired quality of position fix. Stage 38 may report this information to the user (e.g., by reporting an error message to processing stage 18 which may then cause a message to be displayed to the user on display 20) as a prompt for the user to select a different set of configuration parameter using slide bar control 60. Again, any or all of the filtering operations may be done in a parallel, rather than a sequential order.

Figure 7B:
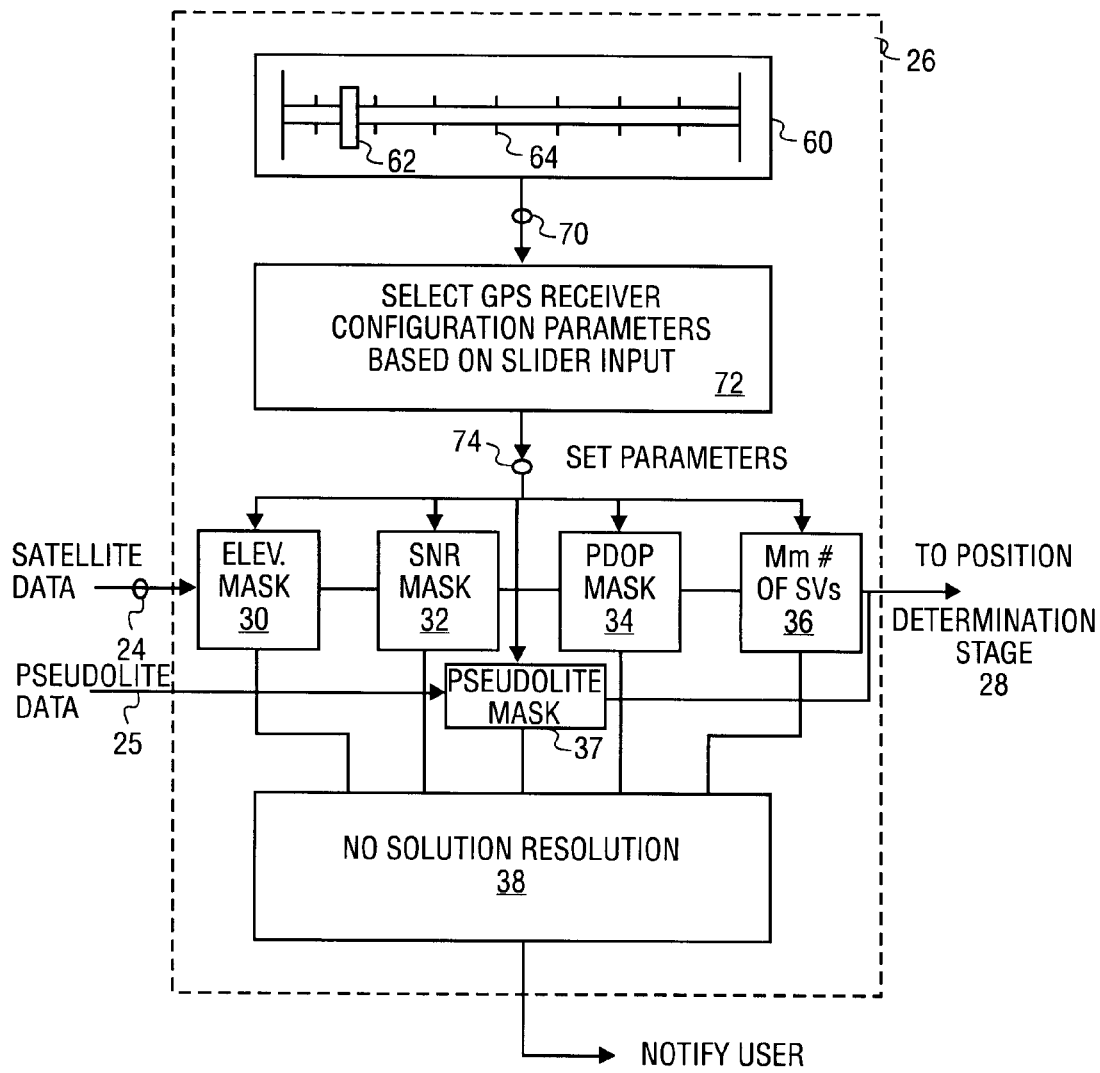

Now referring to FIG. 7b, an alternate configuration is shown. The user input may be received using a slide bar control, which may be a graphical representation displayed to the user or, as shown, may be a physical slide bar control 60 as described above. In this embodiment, satellite data, pseudolite data or a combination of satellite and pseudolite data may be provided to position determination stage of computation of position of the receiver. In this configuration, select signal 70 may be used to access a table such as that illustrated in FIG. 5b. The selection means 72 further provides parameter settings 74 to define pseudolite mask 37. The incoming pseudolite signal 25 is input to pseudolite mask 37, which functions to filter pseudolite data based on criteria, for example that shown in FIG. 5b.

Thus, a user interface for GPS receiver has been described. As indicted throughout this detailed description, however, the exemplary embodiments discussed herein should be regarded as examples of the present invention, which is to be measured only in terms of the claims which follow.

What is claimed is:

1. A method comprising setting a plurality of configuration parameters for at least one global position system (GPS) receiver and at least one pseudolite receiver in response to a single input specifying a desired quality of position estimate to be provided by GPS receiver and pseudolite receiver, the plurality of configuration parameters comprising receiving a pseudolite signal and not receiving the pseudolite signal.

2. The method of claim 1 wherein the user input is received using a slide bar control.

3. The method of claim 2 wherein the slide bar control is a graphical representation displayed to the user of the GPS receiver and Pseudolite receiver.

4. The method of claim 3 wherein the slide bar control allows the user to choose from a number of predetermined settings, each corresponding to a set of GPS receiver configuration parameters and at least one pseudolite configuration parameter.

5. The method of claim 4 wherein the GPS receiver configuration parameters include position dilution of precision (PDOP).

6. The method of claim 4 wherein each set comprises two or more GPS receiver configuration parameters.

7. The method of claim 4 wherein the distribution of the predetermined settings of the slide bar control is non-linear.

8. The method of claim 4 wherein each set of GPS receiver configuration parameters includes one or more settings for GPS receiver parameters chosen from a group comprising a position dilution of precision (PDOP) mask, a signal-to-noise ratio (SNR) mask, an elevation mask and a minimum number of satellites.

9. The method of claim 4, wherein the at lease one pseudolite configuration parameter is based upon criteria selected from the group consisting of velocity of receiver, quantities and pseudolite review quality of position fix and selection signal strength.

10. A method for controlling the performance of at least one global positioning system (GPS) receiver and at least one pseudolite receiver comprising the steps of:

receiving a single input indicating a slide bar setting between a minimum slide bar setting and a maximum slide bar setting representing relative quality of position estimates to be provided by GPS receiver and satellite receiver; and adjusting at least one operating parameter of at least one receiver in response to the slide bar setting, the receiver selected from the group consisting of GPS receivers and pseudolite receivers.

11. The method as set forth in claim 10, wherein the operating parameters are selected from the group consisting of a signal-to-noise-ratio (SNR), PDOP, elevation, minimum number of satellites and pseudolite signal strength and how quickly a fix is desired.

12. The method as set forth in claim 10, wherein the slide bar setting s are selected from a group consisting of quantity measures, quality measures, and speed of acquisition measures.

13. A control system comprising an adjustment mechanism configured to concurrently adjust a number of configuration parameters for at least one receiver selected from the group consisting of global positioning system (GPS) receivers and pseudolite receivers, in response to a single input.

14. The control system of claim 13, wherein the adjustment mechanism comprises a single user interface.

15. The control system of claim 14, wherein, single user interface comprises a slide bar.

16. The control system of claim 15, wherein, the single user interface comprises a graphical representation of a slide bar.

17. The control system of claim 13, wherein the configuration parameters are chosen from a group comprising position dilution of precision (PDOP), signal-to-noise ratio, satellite elevation, a minimum number of satellites and pseudolite signal strength and how quickly a fix is desired.

18. A mechanism for controlling the performance of at least one receiver configured to receive global positioning system signals and pseudolite signals, comprising:

a slide bar configured to control the performance of the at least one receiver by allowing specification of desired quality of position estimates to be provided by the at least one receiver;

a controller, configured to be responsive to the slide bar setting and to adjust at least one receiver operating parameter according to the slide bar setting.

19. The mechanism as set forth in claim 18, wherein the at least one receiver operating parameter is selected from the group comprising a position dilution of precision (PDOP), elevation, signal-to-noise ratio (SNR), a minimum number of satellites in view and pseudolite signal strength.

20. The mechanism as set forth in claim 18, wherein the mechanism is located in a handheld positioning system receiver.

21. A combination global positioning system (GPS) and pseudolite receiver system comprising a user interface configured to concurrently adjust multiple configuration parameters for a GPS and pseudolite receiver system in response to a single signal produced by the user interface to specify a desired quality of position estimate.

22. The combination receiver of claim 21, wherein the user interface is selected from the group comprising a slide bar and a graphical representation of a slidebar.

23. The combination receiver of claim 21, wherein the configuration parameters include position dilution of precision (PDOP), signal-to-noise ratio, satellite elevation, a minimum number of satellites and pseudolite signal strength and how quickly a fix is desired.

24. The combination receiver of claim 21, wherein the user interface allows for specifying a desired quality of position estimate to be provided by the GPS receiver.

25. The combination receiver of claim 21, wherein the user interface comprises a number of predetermined settings, each corresponding to a set of the configuration parameters for the receiver.

26. The combination receiver of claim 25, wherein the sets of configuration parameters corresponding to the predetermined settings of the user interface are distributed in an non-linear fashion over a range of settings provided by the user interface.

27. A combination global positioning system (GPS) receiver and pseudolite receiver comprising a control system which enables adjustment of a plurality of GPS configuration parameters and pseudolite configuration parameters for the GPS receiver and the pseudolite receiver via a single adjustment on a user interface to specify a desired quality of position estimate.

28. The combination receiver of claim 27, wherein the single user interface is selected from the group comprising a slide bar and a graphical representation of a slide bar.

29. The combination receiver of claim 28, wherein the configuration parameters are chosen from a group comprising position dilution of precision (PDOP), signal-to-noise ratio, satellite elevation, a minimum number of satellites strength of pseudolite signal and how quickly a fix is desired.

30. The combined receiver of claim 28, wherein the user interface allows for specifying a desired quality of position estimate to be provided by the combination receiver.

31. The combined receiver of claim 28, wherein the user interface comprises a number of predetermined settings, each corresponding to a set of the configuration parameters for the combination receiver.

* * * * *